United States Patent [19]
Kester et al.

[11] Patent Number: 6,013,296
[45] Date of Patent: *Jan. 11, 2000

[54] FORCED AIR CONVECTION OVEN PROCESS FOR FINISHING FRENCH FRIES

[75] Inventors: Jeffrey John Kester, West Chester; Joseph James Elsen, Cincinnati; Herbert Thomas Young, Cincinnati; Patrick Joseph Corrigan, Cincinnati; David Thomas Biedermann, Cincinnati; Alyce Johnson Papa, Cincinnati, all of Ohio

[73] Assignee: The Procter & Gamble Company, Cincinnati, Ohio

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/967,291

[22] Filed: Nov. 7, 1997

Related U.S. Application Data

[63] Continuation of application No. 08/639,231, Apr. 29, 1996, abandoned.

[51] Int. Cl.[7] .................................................. A23L 1/217
[52] U.S. Cl. ........................... 426/302; 426/523; 426/637
[58] Field of Search .................................. 426/302, 637, 426/438, 523

[56] References Cited

U.S. PATENT DOCUMENTS

| | | |
|---|---|---|
| 2,855,308 | 10/1958 | Buechele . |
| 2,962,419 | 11/1960 | Minich . |
| 3,397,993 | 8/1968 | Strong . |
| 3,579,548 | 5/1971 | Whyte . |
| 3,865,964 | 2/1975 | Kellermeier ............................ 426/307 |
| 3,932,532 | 1/1976 | Hunter . |
| 3,934,046 | 1/1976 | Weaver ................................. 426/418 |
| 4,005,195 | 1/1977 | Jandacek . |
| 4,109,020 | 8/1978 | Gorfien . |
| 4,219,575 | 8/1980 | Saunders . |
| 4,325,295 | 4/1982 | Caridis .................................... 99/339 |
| 4,508,746 | 4/1985 | Hamm .................................... 426/601 |
| 4,542,030 | 9/1985 | Haury . |
| 4,551,340 | 11/1985 | El-Hag . |
| 4,582,927 | 4/1986 | Fulcher . |
| 4,590,080 | 5/1986 | Pinegar ................................... 426/441 |
| 4,632,838 | 12/1986 | Doenges ................................. 426/441 |
| 4,761,294 | 8/1988 | Hamann et al. ........................ 426/438 |
| 4,840,815 | 6/1989 | Meyer .................................... 426/611 |
| 4,861,613 | 8/1989 | White ..................................... 426/611 |
| 4,888,195 | 12/1989 | Huhn ..................................... 426/601 |
| 4,888,196 | 12/1989 | Ehrman .................................. 426/601 |
| 4,900,576 | 2/1990 | Bonnett .................................. 426/438 |
| 4,978,542 | 12/1990 | Buckley ............................. 426/523 X |
| 5,000,970 | 3/1991 | Shanbhag ............................... 426/296 |
| 5,085,884 | 2/1992 | Young .................................... 426/611 |
| 5,104,678 | 4/1992 | Yang ...................................... 426/601 |
| 5,288,512 | 2/1994 | Seiden ................................... 426/607 |
| 5,302,410 | 4/1994 | Calder . |
| 5,308,640 | 5/1994 | Baer ....................................... 426/611 |
| 5,422,131 | 6/1995 | Elsen ...................................... 426/531 |
| 5,648,110 | 7/1997 | Wu . |

FOREIGN PATENT DOCUMENTS

| | | |
|---|---|---|
| 0 026 565 | 1/1980 | European Pat. Off. . |
| 0 342 059 | 12/1989 | European Pat. Off. . |
| 2215902 | 1/1974 | France . |
| 27 13935 | 3/1977 | Germany . |
| 38 14587 A1 | 4/1988 | Germany . |
| 2 078 081 | 1/1981 | United Kingdom . |
| WO 91/00023 | 1/1991 | WIPO . |
| WO 91/15964 | 10/1991 | WIPO . |
| WO 94/05165 | 3/1994 | WIPO . |

OTHER PUBLICATIONS

Talbert et al, "Potato Processing", pp. 491–529 (1987).
"Flavored Vegetable Oils as a Substitute for Beef Tallow in Deep Frying Applications", *Food Technology*, pp. 90–94 (1989).

*Primary Examiner*—Arthur L. Corbin
*Attorney, Agent, or Firm*—Jay A. Krebs; Karen F. Clark; Jacabus C. Rasser

[57] ABSTRACT

The present invention relates to a process for making superior quality oven-finished French fries. i.e., French fried potato strips, by baking prebake par-fries in a forced air convection oven or impingement oven for about 0.5 to about 10 minutes at 325° F. (162.8° C.) to about 600° F. (315.6°) at an air velocity of from about 500 to about 10,000 feet per minute. After baking, the fries are optionally coated with oil. The oven-finished French fries of this invention are like deep fat fried French fries, which are superior in quality compared to the state of the art oven-finished French fries. The oven-finished French fries (shoestring-cut) made by the process of this invention have a bulk moisture of from about 32% to about 46%; a total fat content of from about 12% to about 25%; and a French Fry Texture Value of at least about 200. Preferably the fries have a surface water activity (Aw) of less than about 0.55 and an internal moisture content of from about 55% to about 80%.

29 Claims, No Drawings

FORCED AIR CONVECTION OVEN PROCESS FOR FINISHING FRENCH FRIES

This is a continuation of application Ser. No. 08/639,231, filed on Apr. 29, 1996, now abandoned.

TECHNICAL FIELD

The present invention relates to a process for oven-finishing French fries.

BACKGROUND OF THE INVENTION

French fries are prepared by deep fat frying fresh or "par-fried" potato strips. A major drawback associated with deep fat frying is handling the hot frying oil. Baking the par-fries in an oven avoids this hot frying oil problem. However, there are some major problems associated with state of the art oven-finished French fries. One of the major problems is that a high quality French fry that tastes deep fried is difficult to consistently duplicate in an oven. In other words, a reliable process for making high quality deep fat fried-like oven finished French fries is heretofore unknown. Current oven-finished French fries are generally too limp and soggy or too dry and tough. High quality deep fat fried French fry has a moist interior surrounded by a crisp yet tender outer surface or crust.

It has now been surprisingly discovered that high quality French fries can be prepared quickly and reliably by a specific process comprising baking prebake fries in an oven.

It is an object of the present invention to provide a process for making high quality deep fat fried-like French fries in an oven. It is another object of the present invention to provide a fast food process for quickly finishing frozen par-fries in an oven. It is yet another object of the present invention to provide improved tasting high quality deep fat fried-like oven-finished French fries. Other objects of the present invention will become apparent in view of the following description.

SUMMARY OF THE INVENTION

A process for preparing ready to eat oven-finished French fries, said process comprising baking prebake parfries in a forced air convection oven or impingement oven for about 0.5 minute to about 10 minutes at a temperature of from about 325° F. (162° C.) to about 600° F. (316° C.), wherein said forced air has a velocity of from about 500 feet to about 10,000 feet (152 to about 3048 meters) per minute, and wherein said oven-finished shoestring-cut French fries have: a) from about 32% to 46% bulk moisture; b) from about 12% to about 25% total fat; and c) a Texture Value of at least about 200. Preferably the fries have a surface water activity (Aw) of less than about 0.55 and an internal moisture content of from about 55% to about 80%.

DETAILED DESCRIPTION OF THE INVENTION

As used herein, the terms "par-fry" or "par-fried" or "par-fries" all refer to potato strips that have been subjected to at least one frying process; e.g., deep-fat frying. The parfry has a lower moisture content than a raw potato strip and contains some fat or oil due to the partial frying operation.

The terms "prebake parfries" or "prebake fries" refer to potato strips that have been subjected to at least one frying process and are ready for oven-finishing in accordance with the present invention.

The terms "oven-finished" or "oven-baked" refer to a product that has been subjected to a baking process and is in the ready-to-eat form.

The terms "fat" or "oil" both refer to any edible fatty substances in a general sense; e.g., 100% natural or 100% synthesized fats and oils, etc., unless otherwise specified. Preferred oils consist essentially of triglycerides, such as, for example soybean oil, corn oil, cottonseed oil. sunflower oil, palm oil, coconut oil, fish oil, and edible animal oil such as tallow. These oils can be partially or completely hydrogenated or modified by interesterification. The terms "fat" or "oil" also refer 100% non-toxic fatty materials having properties similar to triglycerides. The terms "fat" or "oil" in general include fat-substitutes, which materials may be partially or fully nondigestible.

The terms "fat" and "oil" are used interchangeably unless otherwise specified.

The term "fat substitute" refers to those edible fatty materials that are partially or totally nondigestible, e.g., polyol fatty acid polyesters such as olestra.

The term "conditioned oil" refers to oil which has been previously used for frying for such a time that it has developed fried flavor.

Unless otherwise stated, all percentages, ratios or proportions expressed herein are by weight.

It has now been surprisingly discovered that higher quality oven finished French fries can be prepared quickly by baking prebake par-fries in a forced air convection oven or impingement oven for from about 0.5 minute to about 10 minutes at a temperature of from about 325° F. (162.80° C.) to about 600° F. (315.6° C.). The hot air velocity within the oven chamber is from about 500 to about 10,000 feet per minute (152–3048 meters per minute).

The baked fries are optionally coated or enrobed after baking with from about 1% to about 10% of oil by weight of the baked fries.

The oven-finished French fries of this invention taste as if they are deep fat fried fries and are characteristizied (shoestring-cut) by a bulk moisture of from about 32% to about 46%, a total fat content of from about 12% to about 25%, and a Texture Value of at least about 200. Preferably the fries have a surface water activity (Aw) of less than about 0.55 and an internal moisture content of from about 55% to about 80%.

The external surfaces of good textured French fries are moderately crisp and not excessively oily. The interior portions are tender, mealy and free from sogginess. These attributes can be measured by a French Fry Texture Value, as defined herein. A Texture Value of greater than about 200 represents a crisp fry with a moist interior. Selected prebake par-fries with certain bulk moisture and oil levels, when oven finished via the process described herein, provide superior French fries over the state of the art oven-finished French fries.

Thicker-cut oven-finished French fries made by the process of this invention (e.g., regular-cut, crinkle-cut and steak fries) have bulk moistures of from about 35% to 53% and total fats of from about 8% to 22%.

Prebake Par-Fries

The prebake par-fries of this invention provide greater flexibility in meal preparation, simplification in storage, inventory control and are more uniform in quality versus preparing French fries directly from raw potatoes.

The prebake par-fries used in the process of this invention can either be prepared from raw potatoes or from potato strips which have previously been par-fried or par-fried and frozen. Raw potatoes (e.g., Russet Burbanks) are washed, peeled, trimmed and cut into strips of a desired size and shape customarily used for French fries. After cutting, the strips may be washed to remove surface starch.

The preferred potato strips are known in the art as "shoestring" cuts. Shoestring potato strips are from about 3/16(0.18) to about 5/16(0.3) inch (4.7–8 mm) square in cross-section and from about 2.5 to about 5 inches (6.3–12.7 cm) in length.

Another cut known in the art as "crinkle cut" strips usually average from about 0.3 to about 0.5 inch (8–13 mm) in cross-section and from about 2 to about 4 inches (5–10.2 cm) in length.

Straight cut thick potato strips (also called regular-cut) are from about 0.3 inch to about 0.5 inch (8 mm–13 mm) square in cross-section and about 2.5 to about 5 inches (6.3–12.7 cm) in length. Larger potato strips of the type referred to as "steak fries" have a rectangular cross-section of about 0.5 inch to about 0.88 inch (13–22 mm) and about 2.5 to about 5.5 inches (6.3–14 cm) in length.

The potato strips are blanched according to conventional procedures known in the art. Blanching inactivates enzymes and removes excess free sugars from the surfaces of the cut strips. Blanching is done by immersion of the strips in hot water at a temperature of about 140° F. (60° C.) to about 200° F. (93° C.) for about 3 to about 20 minutes. Alternatively, the blanching is with steam. at atmospheric pressure for about 2 to about 10 minutes.

Following the blanching step, the potato strips can be treated according to conventional methods known in the art. For instance, the potato strips can be subjected to additional water immersion steps to further leach excess sugars or the strips may be treated with sodium acid pyrophosphate (SAPP), a chelating agent used to prevent discoloration of the strips. Dextrose (corn sugar) can also be applied to the surface of the strips in order to yield a desired level of brown color development during subsequent processing. Other treatments known in the art can also be used.

After blanching and the optional treatments described above, the potato strips are drained and optionally dehydrated to reduce their moisture content. During dehydration of the strips the moisture content is typically reduced to a point at which the strips have lost from about 10% to about 30% of their initial weight, preferably about 15% to about 20% of their initial weight. Any of the conventional drying procedures used in the production of par-fried potato strips may be used, such as, for example, subjecting the potato strips to heated air at temperatures of from about 150° F. (65° C.) to about 350° F. (176° C.) for from about 5 to about 20 minutes. Microwave or radio-frequency drying may also be used.

Generally the blanched potato strips are deep fried or immersed in oil, for example, at a temperature of from about 270° F. (132° C.) to about 385° F. (196° C.). The frying time depends on the specific oil temperature, dimensions of the potato strips, the batch size, the volume of the frying kettle and the initial moisture content of the potato strips. This can be determined by one skilled in the art. Other techniques such as a heated oil spray that surrounds the potato strip with hot oil or frying in an oil foam can be used. The blanched potato strips are immersed in an edible oil for a time sufficient to produce prebake par-fries having from about 38% to about 58% moisture. (Table 1 contains moisture and fat content ranges for preferred shoestring-cuts used in the process of the present invention.) The prebake par-fries of the shoestring variety preferably have from about 40% to about 56% bulk moisture. Preferably these parfries have from about 42% to about 54%, and more preferably front about 44% to about 50% moisture. These prebake parfries have from about 6% to about 25%, preferably from about 8% to about 22%, more preferably from about 10% to about 20%, and most preferably from about 12% to 18% fat.

Thicker cut potato strips (e.g., straight, regular-cuts or crinklecuts, "steak" fries) may be fried to slightly higher moisture contents. Tables 2 and 3 provide ranges for these thicker potato strips.

The prebake par-fries can be commercially prepared by multiple processing steps (i.e., one par-fry and one freezing, or multiple par-fryings and multiple freezings).

After par-frying, the prebake par-fries can be immediately cooled or frozen, packaged and stored for subsequent use. Chilling or freezing of the par-fries can be accomplished by methods known in the art. For example, the par-fries can be subjected to a blast of cold air at a temperature of less than about −20° F. (−29° C.), or the parfries can be immersed in or sprayed with a liquid refrigerant, such as liquid nitrogen. Any conventional freezing process can be used. It is preferred that the par-fries be frozen quickly, i.e. in less than 20 minutes, preferably in less than 5 minutes after completion of the par-frying.

A preferred method for preparing frozen prebake par-fries intended for oven finishing by the process of this application comprises peeling, trimming and cutting raw potatoes into strips, blanching, and reducing the moisture of the potato strips to not less than about 60% via either oven drying or parfrying. The potato strips are then immersed in oil at a temperature of from about 270° F. (132° C.) to about 335° F. (196° C.) for a time sufficient to further reduce the moisture of the strips to a final moisture content of from about 38% to about 58%. Thereafter the prebake par-fries are quickly frozen and stored at a temperature of about 0° F. (−18° C.) The frozen prebake fries are stable at 0° F. (−18° C.) for at least 3 months. When cooked in an oven by the present process, the finished French fries have improved flavor over conventional oven cooked fries.

Table 1 contains moisture and fat content ranges for preferred shoestring-cut prebake par-fries and oven-finished French fries prepared according to the present invention.

TABLE 1

| Shoestring cuts (3/16"–5/16" cross section) | | |
|---|---|---|
| | Prebake Par-fries | Oven-Finished French Fries |
| Moisture Range: | 38–58% $H_2O$ | 32–46% $H_2O$ |
| Preferred: | 40–56% $H_2O$ | 33–44% $H_2O$ |
| More Preferred: | 42–54% $H_2O$ | 34–40% $H_2O$ |
| | 44–50% $H_2O$ | |
| Fat Range: | 6–25% Fat | 12–25% Fat |
| Preferred: | 8–22% Fat | 13–23% Fat |
| More Preferred: | 12–18% Fat | 14–20% Fat |

Table 2 contains moisture and fat content ranges for regular and crinkle-cut prebake parfries and oven-finished French fries.

TABLE 2

Regular-cut and Crinkle-cut (5/16"–1/2" cross section)

|  | Prebake Par-fries | Oven-Finished French Fries |
|---|---|---|
| Moisture Range: | 40–60% H₂O | 35–50% H₂O |
| Preferred: | 44–56% H₂O | 38–48% H₂O |
| More Preferred: | 46–54% H₂O | 40–46% H₂O |
| Fat Range: | 6–22% Fat | 10–22% Fat |
| Preferred: | 8–20% Fat | 11–20% Fat |
| More Preferred: | 10–18% Fat | 12–18% Fat |

Table 3 contains moisture and fat content ranges for steak fries.

TABLE 3

Steak Fries (1/2"–7/8" cross section)

|  | Prebake Par-fries | Oven-Finished French Fries |
|---|---|---|
| Moisture Range: | 42–62% H₂O | 38–53% H₂O |
| Preferred: | 46–58% H₂O | 40–50% H₂O |
| More Preferred: | 48–56% H₂O | 42–48% H₂O |
| Fat Range: | 4–20% Fat | 8–20% Fat |
| Preferred: | 6–18% Fat | 9–18% Fat |
| More Preferred: | 8–16% Fat | 10–16% Fat |

Edible Fats and Oils

The fats used herein to fry and optionally coat the fries after baking are selected from the group consisting of triglycerides, non-igestible fats or reduced calorie fats and mixtures thereof. Preferred triglycerides include soybean oil, corn oil, cottonseed oil, sunflower oil, palm oil, coconut oil, canola oil, fish oil, tallow, peanut oil, medium chain triglycerides, structured triglycerides containing a combination of short or medium chain fatty acids and long chain fatty acids (e.g. Caprenin-like) and the like which may have been partially or completely hydrogenated or otherwise modified. Non-toxic fatty, materials having properties similar to triglycerides, herein referred to as fat substitutes can be partially or fully indigestible. Reduced calorie fats and edible non-digestible fats, oils or fat substitutes can also be used.

A variety of edible fats and oils can be used to fry the potato strips. Edible fats and oils suitable for use include but are not limited to those listed above. If desired the oils can be conditioned or flavored, see "Flavored Vegetable Oils as a Substitute for Beef Tallow in Deep Frying Applications", *Food Technology*, pp. 90–94 (1989) and U.S. Pat. No. 5,104,678 (Yang et al.).

Preferably the edible fat or oil used to fry the potato strips has a free fatty acid level of about 0.8% or less.

The edible oils used for frying potato strips or for coating of baked fries after baking can be a 100% natural oil or a 100% synthetic oil. The oil may be partially or completely hydrogenated or modified otherwise. The preferred fat substitute are fatty materials having properties similar to triglycerides such as sucrose fatty acid polyesters. OLEAN™ is a preferred fat substitute made by The Procter and Gamble Company. Reduced calorie fats, polyol fatty acid polyesters, and diversely esterified polyol polyesters or combinations of regular fats and fat substitutes can also be used herein. These preferred nondigestible fat or oil substitute compositions are described in the literature, for example, in Young; U.S. Pat. No. 5,085,884; Issued Feb. 4, 1992, and U.S. Pat. No. 5,422,131, issued Jun. 6, 1995 to Elsen et al.

One reduced calorie fat that has been found to be useful comprises a fairly high level (e.g., at least about 85%) of combined MML and MLM triglycerides, where M is typically a mixture of $C_8$–$C_{10}$ saturated fatty acids and L is predominantly behenic acid, but can be $C_{20}$–$C_{24}$ See U.S. Pat. No. 4,888,196 to Ehrman et al., issued Dec. 9, 1989 and U.S. Pat. No. 5,288,512 issued to Seiden. Feb. 22, 1994 for the synthesis and more detailed description of these reduced calorie fats.

By "polyol" is meant a polyhydric alcohol containing at least 4, preferably from 4 to 11 hydroxyl groups. Polyols include sugars (i.e., monosaccharides, disaccharides, and trisaccharides), sugar alcohols, other sugar derivatives (i.e., alkyl glucosides), polyglycerols such as diglycerol and triglycerol, pentaerythritol and polyvinyl alcohols. Specific examples of suitable sugars, sugar alcohols and sugar derivatives include xylose, arabinose, ribose, xylitol, erythritol, glucose, methyl glucoside, mannose, galactose, fructose, sorbitol, maltose, lactose, sucrose, raffinose, and maltotriose.

By "polyol fatty acid polyester" is meant a polyol having at least 4 fatty acid ester groups. Polyol fatty acid esters that contain 3 or less fatty acid ester groups are generally digested in, and the products of digestion are absorbed from, the intestinal tract much in the manner of ordinary triglyceride fats or oils, whereas those polyol fatty acid esters containing 4 or more fatty acid ester groups are substantially non-digestible and consequently non-absorbable by the human body. It is not necessary that all of the hydroxyl groups of the polyol be esterified, but it is preferable that disaccharide molecules contain no more than 3 unesterified hydroxyl groups for the purpose of being non-digestible. Typically, substantially all, e.g. at least about 85%. of the hydroyl groups of the polyol are esterified. In the case of sucrose polyesters, typically from about 7 to 8 of the hydroxyl groups of the polyol are esterified.

The polyol fatty acid esters typically contain fatty acid radicals typically having at least 4 carbon atoms and up to 26 carbon atoms. These fatty acid radicals can be derived from naturally occurring or synthetic fatty acids. The fatty acid radicals can be saturated or unsaturated, including positional or geometric isomers, e.g., cis- or trans- isomers, and can be the same for all ester groups, or can be mixtures of different fatty acids.

Liquid non-digestible oils have a complete melting point below about 37° C. include liquid polyol fatty acid polyesters (see Jandacek, U.S. Pat. No. 4,005,195; Issued Jan. 25, 1977); liquid esters of tricarballylic acids (see Hamm; U.S. Pat. No. 4,508,746; Issued Apr. 2, 1985); liquid diesters of dicarboxylic acids such as derivatives of inalonic and succinic acid (see Fulcher; U.S. Pat. No. 4,582,927; Issued Apr. 15, 1986); liquid triglycerides of alpha-branched chain carboxylic acids (see Whyte; U.S. Pat. No. 3,579,548; Issued May 18, 1971); liquid ethers and ether esters containing the neopentyl moiety (see Minich; U.S. Pat. No. 2,962,419; Issued Nov. 29, 1960); liquid fatty polyethers of polyglycerol (See Hunter et al; U.S. Pat. No. 3,932,532; Issued Jan. 13, 1976); liquid alkyl glycoside fatty acid polyesters (see Meyer et al; U.S. Pat. No. 4,840,815; Issued Jun. 20, 1989); liquid polyesters of two ether linked hydroxypolycarboxylic acids (e.g., citric or isocitric acid) (see Huhn et al; U.S. Pat. No. 4,888,195; Issued Dec. 19, 1988); liquid esters of epoxide-extended polyols (see White et al; U.S. Pat. No. 4,861,613; Issued Aug. 29, 1989); all of which are incorporated herein by reference, as well as liquid polydimethyl siloxanes (e.g., Fluid Silicones available from Dow Corning).

Combination of liquid and solid polyol fatty acid esters can be used, see for example, Young; U.S. Pat. No. 5,085,884; Issued Feb. 4, 1992, and U.S. Pat. No. 5,422,131, issued Jun. 6, 1995 to Elsen et al., incorporated herein by reference.

Additional Ingredients

Flavoring agents, such as salt, pepper, butter, onion, or garlic may be added to the frying and/or coating oil to enhance the flavor or modify the flavor to any desired taste. One skilled in the art will readily appreciate that the aforementioned listing of flavoring agents is in no way exhaustive, but is merely suggestive of the wide range of additives which are suitable for use in the practice of the present invention.

Other ingredients known in the art may also be added to the edible fats and oils used to fry the par-fried potato strips, including antioxidants such as TBHQ, chelating agents such as citric acid, and anti foaming agents such as dimethylpolysiloxane.

Oven Finishing

The prebake par-fries are baked in a forced air convection or impingement oven. Table 4 contains suitable baking times, temperatures, and air velocities used in the process of this invention for oven finishing the prebake fries. Preferred baking times are 0.75 minute to 5 minutes, more preferably 1 minute to 4 minutes, and even more preferably 1.5 minute to 3 minutes. A preferred temperature range is 350° F. to 500° F. (176° C. to 260° C.), more preferably 375° F. to 475° F. (190° C. to 246° C.), and even more preferably 400° F. to 450° F. (204° C. to 232° C). Preferred hot air velocities within the oven chamber are 1,000 to 8,000 feet per minute, more preferably 2,000 to 6,000 feet per minute, and more preferably 3,000 to 5,000 feet per minute.

Any suitable high velocity forced air convection or impingement oven can be used alone or in combination with other types of ovens. The prebake parfries may be in a single layer or they may be tumbled in a rotating drum during baking. The specific baking time will vary somewhat depending on the type of oven, baking temperature, and air velocity.

TABLE 4

Forced Air Convection Oven Conditions

| | Range | Preferred Range | More Preferred | More Preferred |
|---|---|---|---|---|
| Bake Time (minutes) | 0.5–10 | 0.75–5 | 1–4 | 1.5–3 |
| Temperature (° F.) | 325–600 | 350–500 | 375–475 | 400–450 |
| Temperature (° C.) | 162.8–315.6 | 176.7–260 | 190.6–246.1 | 204.4–232.2 |
| Velocity (ft/min.) | 500–10000 | 1000–8000 | 2000–6000 | 3000–5000 |
| Velocity (meter/min.) | 152–3048 | 305–2438 | 610–1829 | 914–1524 |

Some examples of suitable ovens are: forced air convection ovens, combination infrared radiation/forced air convection ovens, high velocity air impingement ovens, and combination microwave/forced air convection ovens. Conventional microwave ovens can be used for warming frozen prebake par-fries prior to placing them into another suitable oven for finishing. The names of suppliers and models of some suitable ovens are:

1. Forced Air Convection Ovens
   A. Wells Manufacturing Co., Verdi, Nev., Model No. M42003S (Convection oven).
   B. U.S. Range, Gardena, Calif., Model No. BG-100 (Convection Oven).
   C. Blodgett Oven Co., Burlington, Vt., Model No. DFG-100 Convection Oven.

2. Hot Air Impingement Ovens
   A. Lincoln Foodservice Products, Fort Wayne, Ind. (Impinger I oven).
   B. Middleby Marshall, Elgin, Ill. Model No. PS200, (Double Impingement Oven).
   C. Blodgett Oven Co., Burliiigton, Vt. Model No. NMT2136; (Mastertherm Convevor Oven)
   D. Wolyerine Corporation, Merrimac, Mass. Model 2.0× 051 Jetzone™ Double Impingement Oven In one preferred embodiment, the prebake par-fries are baked as a single layer on an open mesh metal oven tray or basket. For a continuous process a metal conveyor belt can be used. An essentially single layer of fries allows at least a majority of the fries to be in direct contact with the oven tray. Preferably, frozen prebake par-fries are first baked on a metal wire mesh oven rack or tray for about 0.5 to about 2 minutes. Then they are transferred to a solid metal oven tray and baked until they are done. This second baking is preferably about 1 to 3 minutes. Generally, prior art frozen potato strips are baked for about 10 to 20 minutes. Faster oven finishing time is one of the primary benefits of this invention.

The specific oven process conditions used for preparing the oven-finished French fries will depend upon the quantity of prebake fries being baked, their initial temperature, the type of oven, and the thermal properties of the prebake par-fries. Of particular importance are the thermal conductivity of the low-moisture crust region, the thermal conductivity of the high-moisture interior starch-matrix core, and the surface heat transfer coefficient of the prebake par-fry. In general, higher thermal conductivities and higher surface heat transfer coefficients will result in more rapid transfer of heat from the oven to and through the fry, resulting in reduced cooking time. Since it is an object of the present invention to provide a fast food process for quickly finishing frozen par-fries in an oven, these properties are of particular importance. The desirable thermal conductivities at oven temperature of the low moisture crust region in the prebake fry are from about 0.1 to about 0.3 watt/m-° C. The desirable thermal conductivities at oven temperature of the high moisture core region in the prebake fry are from about 0.4 to about 0.7 watts/m-° C. The thermal conductivity of the crust region can be adjusted to the desirable range by controlling the level of moisture and fat in the crust.

The surface heat transfer coefficient of the prebake par-fry is a function of forced air velocity, air temperature, and the nature of any applied film at the surface of the fry. Higher surface heat transfer coefficients are desirable since this will generally lead to faster cooking time, and the formation of more distinct and crisp low moisture crust region in the oven-finished French fry. The desirable surface heat transfer coefficients at oven temperature of the prebake par-fry in the oven are from about 50 to about 400 watts/m$^2$-° C. The surface of the prebake par-fries can be modified to increase the surface heat transfer coefficient. This can be accomplished by a number of means including enrobing the fry in a substance that will increase the conduction of heat from the air to the fry surface. Substances that can increase this conduction include edible fats and oils, externally applied water or water-based batters, gums, and hydrocolloids. The surface of the prebake par-fry may also be modified to improve the absorption of radiant heat from the oven. A typical method of accomplishing this would be to alter the color, porosity, and or reflectivity of the surface. Increasing the velocity, of the oven air at the surface of the par-fry will also increase the surface heat transfer coefficient.

The baked fries are optionally coated with oil after baking with from about 1% to about 10% of oil by weight of the baked fries. Coating the oven-finished French fries with a thin film of oil after baking in the oven can result in desirable fat content of the finished French fries and also a more desirable taste (e.g., flavor, mouthfeel). Preferably about 2% to about 8%, more preferably about 4% to about 6% of oil is coated onto the surface of the fries after baking. The oil used for coating the fries may be conditioned or otherwise flavored to provide enhanced positive flavor. Any conventional coating technique can be used to apply oil to the surface of the oven finished fries. For example, the oil can be sprayed or misted onto the baked fries or the baked fries can be rapidly dipped or immersed in the oil. Other methods for applying oil to the surface of the baked fries include pan coating, tumble coating, curtain coating and falling film methods. The coating oil should be warm to hot.

High quality French fries are golden brown in color and have crisp crusts and moist interiors. The oven-finished French fries made by the process described herein have the color, texture, mouthfeel and taste of high quality deep fat fried French fries, e.g., M$^c$Donald's™ fries.

High Quality Oven-Finished Fries

The process of the present invention provides superior oven-finished French fries. Table 5 contains a detailed description of high quality oven-finished shoestring-cut French fries made by the process of the present invention. These superior oven-finished shoestring-cut French fries have: a bulk moisture of from about 32% to about 46%; preferably 33% to 44%, more preferably 34% to 40% bulk moisture. They also have a total fat content of from about 12% to about 25%, preferably 13% to 23%, more preferably about 14% to 20% total fat. The preferred oven-finished shoestring French fries have an internal moisture content of from about 55% to 80%, preferably about 60% to 77%, more preferably about 63% to about 75% moisture. They have a surface water activity (Surface Aw) equal to or less than about 0.55, preferably from about 0.10 to about 0.52, more preferably from about 0.15 to about 0.5, and even more preferably 0.2–0.45. The texture of fries and baked food products is known to be related in part to the water activity (Aw) of the product. Crisp textures are generally associated with Aw values of less than about 0.55. The preferred oven-finished shoestring French fries have a Texture Value of about 200 or greater, preferably about 210 to 1000, more preferably 220 to 600, and even more preferably 240 to 500.

TABLE 5

HIGH QUALITY OVEN-FINISHED SHOESTRING-CUT FRENCH FRIES*

|  | Range | Preferred Range | More Preferred |
|---|---|---|---|
| Bulk Moisture: | 32–46% | 33–44% | 34–40% |
| Total Fat: | 12–25% | 13–23% | 14–20% |
| Internal Moisture‡: | 55–80% | 60–77% | 63–75% |
| Surface Aw | ≦0.55 | 0.1–0.52 | 0.2–0.45 |
| FFTV**: | ≧200 | 210–1000 | 240–500 |

*High quality deep-fat fried French fries and the oven-finished French fries of this process invention have all these qualities. The prior art oven-finished French fries do not.
**French Fry Texture Value (Texture Value)
‡Preferred The French Fry Texture Value is measured by a compression test, which is described in detail in the following section on analytical test methods. The French Fry Texture Value Test yields two measurements that characterize the textural properties of French fries, average Maximum Force (grams) and average Area (gram×sec). Both of these texture measurements correlate to the crispness of French fries and either one may be designated as the Texture Value.

As described above and in Tables 5–7, high quality oven-finished French fries are characterized by a Texture Value of about 200 or greater, which means that at least one of the textural parameters (Maximum Force or Area) has a value of about 200 or greater. The most highly preferred oven-finished French fries prepared by the process described herein are further characterized by a ratio of the Area (gram×sec) to the Maximum Force (grams) of at least 1.0, preferably 1.04 or greater, more preferably 1.08 or greater, even more preferably 1.12 or greater, and most preferably 1.16 or greater. The high quality oven-finished French fries made by the process described herein, as well as deep fat fried French fries (e.g., M$^c$Donald's™ fries), are characterized by a Texture Value of about 200 or greater and a ratio of the Area to Maximum Force of at least 1.0. For illustration, following are textural data generated for multiple batches of McDonald's™ deep fried French fries:

| Batch # | Avg. Maximum Force (grams) | Avg. Area (gram × sec) | Ratio of Area to Max. Force |
|---|---|---|---|
| 1–10 | 227 | 286 | 1.26 |
| 11–20 | 348 | 431 | 1.24 |
| 21–30 | 323 | 403 | 1.25 |
| 31–40 | 266 | 335 | 1.26 |
| 41–50 | 330 | 415 | 1.26 |
| 51–60 | 243 | 294 | 1.21 |

Thicker-cut oven-finished French fries (e.g., regular-cut, crinkle-cut and steak fries) have different moisture and fat ranges. See Tables 6–7 for summaries.

Table 6 contains a detailed description of high quality oven-finished regular or straight cuts and crinkle cut French fries made by the process of the present invention.

TABLE 6

HIGH QUALITY OVEN-FINISHED REGULAR CUTS

|  | Range | Preferred Range | More Preferred |
|---|---|---|---|
| Bulk Moisture: | 35–50% | 38–48% | 40–46% |
| Total Fat: | 10–22% | 11–20% | 12–18% |
| Internal Moisture‡: | 55–80% | 60–77% | 63–75% |
| Surface Aw: | ≦0.55 | 0.1–0.52 | 0.2–0.45 |
| Texture Value**: | ≧200 | 210–1000 | 240–500 |

Table 7 contains a detailed description of high quality oven-finished steak fries made by the process of the present invention.

TABLE 7

STEAK FRIES

|  | Range | Preferred Range | More Preferred |
|---|---|---|---|
| Bulk Moisture: | 38–53% | 40–50% | 42–48% |
| Total Fat: | 8–20% | 9–18% | 10–16% |
| Internal Moisture: | 55–80% | 60–77% | 63–75% |
| Surface Aw: | ≦0.55 | 0.1–0.52 | 0.2–0.45 |
| Texture Value**: | ≧200 | 210–1000 | 240–500 |

The oven-finished French fries made by the process described herein can also be characterized, by Nuclear Magnetic Resonance (NMR) imaging, which provides a cross-sectional image depicting the moisture and fat distribution within the fries. The high quality oven-finished French fries made by the process described herein, as well as deep fat fried French fries (e.g., McDonald's™ fries), are characterized by NMR images that reveal a high moisture internal core surrounded by a low moisture crust region that contains the fat.

While specific preferred processing steps have been disclosed to facilitate an understanding of the invention, the functional equivalents can be substituted or additional ingredients may be added without departing from the spirit or essential characteristics of the present invention. Accordingly, the disclosed embodiments are considered in all respects to be illustrative and not restrictive.

ANALYTICAL TEST METHODS

A number of parameters are used to characterize elements of the prebake par fries and oven-finished French fries of the present invention. They are quantified by particular experimental analytical procedures. Each of these procedures is described in detail as follows:

Bulk Moisture Content Test

Moisture content of prebake par fries and finished French fries is determined by a forced air oven method as follows:
1. Uniformly grind up a representative sample of potato strips or French fries in a blender or conventional food processor.
2. Accurately weigh approximately 5 grams of ground sample (weight "A") into a previously tared metal pan or dish.
3. Place the metal dish containing the sample in a forced air convection oven at 105° C. for 2 hours.
4. After 2 hours, remove the metal dish containing the dried sample and allow to cool to room temperature in a desiccator over a desiccant such as anhydrous calcium sulfate.
5. Re-weigh the dish containing the dried sample and calculate the weight of the dried sample (weight "B") by subtracting the dish tare weight.
6. Calculate the percent moisture of the sample as follows:

$$\% \text{ Moisture} = [(A-B)/(A)] \times 100.$$

French Fry Texture Value Test

The Texture Value of finished French fries, which correlates with crispness of the fries, is measured with a TA-XT2 Texture Analyzer (version 05.16 equipped with 25–1 load cell, Texture Technologies Corp., Scarsdale, N.Y.). The Texture Analyzer is linked to a standard personal computer (e.g. IBM 433DX) that records the data via a software program called XT.RA Dimension (version 3.7H, Texture Technologies Corp. Scarsdale, N.Y.).

The Texture Analyzer is configured with a rectangular, blunt steel plate probe (2.5–3.0 mm thickness, 70 mm width, 90 mm length) that is fastened vertically to the main arm. A "Compression Test" on a single French fry will be run to generate a plot of Force (grams) vs. Time (sec), from which the Texture Value is obtained.

Procedure for Set-up and Calibration of the Texture Analyzer

1. Set-up the Texture Analyzer as follows:
    Mode: Measure Force in Compression
    Option: Return to Start
    Force Units: Grams
    Time Units: Seconds
    Distance Format: Strain
    Pre-Test Speed: 2.0 mm/sec
    Probe Test Speed: 1.0 mm/sec
    Post-Test Speed: 10 mm/sec
    Strain: 85.0%
    Trigger Type: Auto 10
2. Set the texture method as follows:
    Graph Type: Force vs. Time
    Auto-Scaling: Off
    Force Scaling Max: 5000 grams
    Force Scaling Min: 0 grams
    Peak Confirmation: On
    Force Threshold: 20 grams
    File Type: Lotus 1-2-3
    Display and Export: Plotted points
    Acquisition Rate: 200 pps
    Force Units: Grams
    Contact Area: 1.00 mm$^2$
    Contact Force: 5.0 grams
3. Calibrate the force by placing a 5 kg weight on the calibration platform and press the "calibrate" button on the Texture Analyzer key pad.
4. Calibrate the probe distance from the base plate with a probe starting distance from the plate of 10 mm for shoestring-cut fries (increase probe starting distance to 15 mm for thick-cut or steak fries). Enstire that the bottom surface of the probe is parallel to the surface of the base plate.

Procedure for Sample Measurements

1. Immediately following removal of finish-cooked French fries from a fryer (deep-fried) or oven (oven-baked), place the batch of fries under a heat lamp for 1 minute prior to beginning the texture analysis. The air temperature under the heat lamp is between about 130° F. and about 180° F. (about 54.3° C. to about 82.2° C.).
2. After the 1 minute hold time has elapsed, place a single French fry flat on the base plate of the Texture Analyzer (oriented perpendicular to the probe width). Initiate the Compression Test (1.0 mm/sec probe speed) while manually holding the ends of the French fry flush against the base plate.
3. The resulting Force (grams) vs. Time (sec) data is saved for later analysis. Nine additional fry samples from the same batch are tested in an identical manner. The ten fry samples from each batch are selected randomly. Texture analysis of the ten fry samples should be completed within 3–4 minutes. (3–4 minutes after Step 1).
4. Steps #1–3 are repeated for each new batch of French fries. Generally, 5 to 10 batches of each type of French fry are evaluated in this manner.

Data Analysis

1. The "Force vs. Time" plot for each individual French fry sample is evaluated for the following:
    Maximum Force (grams) within the first ⅓ of the test.
    Area (gram sec) under the curve within the first ⅓ of the test. (e.g. if the Compression Test requires 6 seconds to complete, the Maximum Force and Area are obtained from the 0–2 second time period)
2. After analysis of the "Force vs. Time" data for all ten French fry samples selected from a given batch, the ten Maximum Force values are averaged and the ten Area values are averaged. A computer program written in Excel automates the task of analyzing the Force vs. Time data for each fry sample and averaging the Maximum Force and Area values for each batch of fries.

3. Remaining batches of a particular French fry type are analyzed in a similar manner (5–10 batches are tested; 10 fries/batch are analyzed). The Maximum Force and Area values for each batch are then averaged to yield an overall average Maximum Force (grams) and Area (gram sec) for that particular fry type.

4. For the purpose of this invention, either the overall average Maximum Force or Area may be designated as the French fry TEXTURE VALUE. Both texture measurements correlate to crispness of finished French fries.

Determination of the Internal Moisture Content of French Fries

Internal moisture content of finished French fries, i.e. moisture content of the interior starch matrix, is determined as follows:

1 Immediately following removal of finish-cooked French fries from a fryer (deep-fried) or oven (oven-baked), immerse the fries in liquid $N_2$ for 20 seconds to completely freeze the products and stabilize the internal moisture distribution.

2. Store the frozen French fries at about −112° F. (−80° C.) until analysis.

3. Remove several fries from the freezer and place on a stainless steel tray. Allow the fries to warm slightly for several minutes at room temperature to facilitate removal of the crust.

4. Carefully cut off the crust on one side of each frozen fry with a razor blade. Rotate the fries and repeat this procedure until the crust has been removed from all four sides.

5. Collect the frozen interior starch matrix (white solidified material) and immediately place in a capped glass vial. Take care only to collect the interior starch matrix; do not include any crust remnants.

6. Repeat steps #3–#5 until approximately 5 grams of frozen interior starch matrix is collected. This may require about 15–20 fries.

7. Accurately weigh approximately 5 grams of the interior starch matrix (weight "A") into a previously tared metal pan or dish.

8. Place the metal dish containing the interior starch matrix in a forced air convection oven at 105° C. for 2 hours.

9. After 2 hours, remove the metal dish containing the dried sample and allow to cool to room temperature in a desiccator over a desiccant such as anhydrous calcium sulfate.

10. Re-weigh the dish containing the dried sample and calculate the weight of the dried sample (weight "B") by subtracting the dish tare weight.

11. Calculate the percent moisture of the interior starch matrix as follows: % internal moisture=$[(A-B)/(A)]\times 100$ Determination of the Surface Water Activity (Aw) of French Fries Surface Aw of finished French fries is determined as follows:

1. Immediately following removal of finish-cooked French fries from a fryer (deep-fried) or oven (oven-baked), immerse the fries in liquid $N_2$ for 20 seconds to completely freeze the products and stabilize the internal moisture distribution.

2. Store the frozen French fries at about −112° F. (−80° C.) until analysis.

3. Transfer a bag of French fries (~0.5–1 lb.) from the −112° F. (−80° C.) freezer to a cooler containing dry ice; ensure the bag is thoroughly packed in dry ice in order to maintain the fries in a frozen state at low temperature.

4. Remove one French fry at a time from the sample bag and rapidly scrape the surface of the fry with a single-edged razor blade. Collect the surface shavings onto a stainless steel tray and immediately transfer the shavings to a capped glass vial.

Take care only to collect surface shavings from the outer crust region of the French fry: do not scrape so hard such that the crust region is penetrated and the interior starch matrix core is exposed.

5. Repeat step #4 until approximately 0.3–0.7 gram of surface shavings is collected; this will require scraping about 10–20 frozen fries.

6. Determine the water activity (Aw) of the surface shavings using a Rotronic Hygroskop Model DT relative humidity meter (Rotronic Instrument Corp. Huntington, N.Y.), as follows:

a. Transfer the surface shavings to a plastic Aw dish (Rotronic Instrument Corp.).

b. Immediately place the Aw dish containing the surface shavings into one of the humidity cells of the Hygroskop Model DT relative humidity meter and close the cell cover tightly.

c. Allow the meter reading to stabilize (wait 1 hour or longer) before recording the reading and temperature.

d. Convert the stabilized meter reading to % Relative Humidity (RH) using a previously prepared calibration graph (meter reading vs. % RH) prepared with the following RH standards:

| | |
|---|---|
| 11% RR | Saturated solution of Lithium Chloride (see Greenspan, L., 1977, J. Res. Natl. Bur. Stand., Section A, 81A:89) |
| 35% RH | Standard solution from Rotronic Instrument Corp. |
| 50% RH | Standard solution from Rotronic Instrument Corp. |
| 65% RH | Standard solution from Rotronic Instrument Corp. | e. Convert % RH of the surface shavings to Surface Aw as follows:

Surface Aw=[% RH/100].

Total Fat Content Test

Total fat content of par-fried potato strips, prebake par-fries, and finished French fries is determined by a solvent extraction method as follows:

Apparatus

1. Soxtec HT6 extraction system; unit includes heating block and cooling condenser.
2. Recirculating water bath for cooling condenser.
3. Recirculating oil bath for heating block.
4. Extraction beakers.
5. Extraction thimbles, 26 mm (Fisher TC1522-0018).
6. Nitrogen purging gas
7. Vacuum drying oven
8. Analytical balance (4 place)
9. Dispensing pipette (50 ml)

Materials

1. Methylene chloride (Baker 9315-33)
2. Boiling stones (Chemware PTFE Fisher 09-191-20)
3. Silicone oil (Fisher TC1000-2779)
4. Glass wool (Fisher 11-390)

Procedure

1. Uniformly grind a representative sample of potato strips or French fries in a blender or conventional food processor.

2. Accurately weigh (to four places) a piece of glass wool (sufficient in size to contain sample pieces in the thimble) and the extraction thimble; record weight of thimble+glass wool (weight "A").
3. Load the ground sample into the thimble and cap the loaded thimble with the pre-weighed piece of glass wool.
4. Accurately weigh (to four places) and record the weight of the ground sample, thimble,+glass wool (weight "B").
5. Place two or more boiling stones into an extraction beaker and weigh (to four places); record weight of extraction beaker+boiling stones (weight "C").
6. Place loaded thimbles on the extraction unit and raise the thimbles to rinse position.
7. Pipette 50 ml of methylene chloride into each pre-weighed extraction beaker with boiling stones.
8. Set oil heating bath to 110° C. and water cooling bath to 28.3° C. and allow temperatures to equilibrate.
9. Lower the loaded thimbles into the extraction beaker containing the solvent and allow to boil in the solvent for 60 minutes with the condenser's pet cock in the open position.
10. Raise the thimbles to the rinsing position and rinse for 60 minutes.
11. Turn the condenser's pet cock to the closed position and allow the solvent to evaporate for 60 minutes. Turn the nitrogen purging gas on to aid the evaporation.
12. Transfer the beaker to a vacuum oven, pre-warmed to 120° C., for 30 minutes at full vacuum (about 30 mm Hg pressure or less).
13. Allow the beaker to cool to room temperature and weigh (to four places); record the weight of the beaker+boiling stones+extracted fat (weight "D").
14. Calculate percent total fat as follows:

% Fat=[(D−C)/(B−A)]×100

EXAMPLES

The following are non limiting examples of the present invention.

Example 1

High quality frozen commercially available shoestring cut par-fries (e.g., Simplot Par Fries, J. R. Simplot Co., Caldwell, Id.) are acceptable starting products. The par-fries have a moisture content of about 64%. About 1 lb. of the par-fries are deep fried in a 45 lb. oil capacity fryer containing Primex 108 vegetable oil (blend of partially hydrogenated soybean oil and corn oil; available from the Procter & Gamble Co.) for about 3 minutes at a temperature of about 290° F. (144° C.) to produce prebake par-fries. The prebake par-fries are then immediately frozen by immersion in liquid nitrogen for about 20 seconds. The moisture content of the prebake par-fry is about 48% and the fat content is about 16%. The frozen prebake fries are packed into tightly sealed packages and stored at nonnal freezer temperatures of approximately 0° F. (−18° C.) to about −20° F. (−29° C.).

About 128 grams of the above frozen prebake par-fries are placed on an open wire mesh oven tray in a single layer and then baked at a temperature of about 400° F. (204° C.) in a forced air convection oven (Wells Manufacturing Co.; Model No. M42003S) for about 1 minute. Then the fries are transferred to a solid stainless steel oven tray in a single layer and baked an additional 1.5 minutes. A turbulent hot air flow exists within the oven chamber. The air velocity at the center of the oven chamber (immediately above the product bed), measured with a pitot tube and a manometer (Dwyer Mark II model 2T650), is about 900 feet per minute (274 meters per minute). The resulting oven-finished French fries have: a bulk moisture of about 36%, a fat content of about 18%; an internal moisture content of about 70%, Surface Aw of about 0.5, and a French Fry Texture Value of about 240. The oven-finished French fries are virtually identical in flavor and texture to gold standard deep fried French fries.

Example 2

Commercially available frozen shoestring-cut par-fried potato strips (e.g. Simplot Par Fries, J. R. Simplot Co., Caldwell, Id.) are obtained for additional processing. The parfries have a bulk moisture content of about 64%.

The above-mentioned par-fried potato strips are further processed. First, about 1 lb. of the frozen potato strips are fried in a 45 lb. fryer containing Primex 108 vegetable oil (blend of partially hydrogenated soybean oil and corn oil: available from The Procter & Gamble Co.) for 3 minutes at a temperature of about 290° F. (~144° C.) to produce prebake par-fries, The prebake par-fries are then frozen by immersion in liquid nitrogen for 20 seconds and stored at −20° F. (−29° C.). The prebake par-fries have a moisture content of about 47% and a fat content of about 15%.

About 128 grams of the frozen prebake par-fries are placed in an open wire mesh basket in a single layer. The basket is placed within the treatment zone of a high velocity impingement oven (manufactured by Industrial Combustion Services, Inc. Tyrone, Ga.). Hot air at 375° F. is directed onto the layer of prebake par-fries from the top. The air velocity measured just above the layer of parfries is about 5,000 feet per minute (1,524 meters per minute). Total baking time is 2.5 minutes; with agitation of the product bed after 1 minute to increase cooking uniformity. Immediately after baking, the fries were deposited onto a stainless steel tray and sprayed lightly with warm (~40° F.; 60° C.) conditioned Primex 108 vegetable oil; about 3% oil was sprayed onto the baked fries. The resulting French fries have: a bulk moisture of about 39%; a total fat content of about 16%; an internal moisture content of about 73%; a Surface Aw of about 0.3, and a French Fry Texture Value of about 550 (Max. Force= 500 g; Area=657 g×sec.; Ratio of Area to Max. Force=1.19). The oven-finished French fries are virtually identical in taste and texture to gold standard deep fried French fries.

Example 3

Commercially available frozen shoestring-cut parfried potato strips (e.g., Payette Farms Shoestring Frozen Potatoes, J. R. Simplot Co., Caldwell, Id.), which have a bulk moisture content of about 70%, are used as the starting material.

The above-mentioned par-fried potato strips are further processed. First, about 1 lb. of the frozen potato strips are fried by immersing in Primex 108 vegetable oil (blend of partially hydrogenated soybean oil and corn oil; available from The Procter & Gamble Co.) for 3 minutes at a temperature of about 335° F. (~168° C.) to produce prebake par-fries. The prebake par-fries are then frozen by immersion in liquid nitrogen for 20 seconds and stored at 0° F. (−18° C.). The frozen prebake par-fries have a moisture content of about 44% and a fat content of about 15%.

About 128 grams of the above frozen prebake par-fries are placed on an open wire mesh oven tray in a single layer and then baked at a temperature of about 400° F. (204° C.) in a forced air convection oven (Wells Manufacturing Co., Model No. M42003S) for about 2 minutes. A turbulent air flow exists within the oven chamber. The hot air velocity measured at the center of the oven chamber (just above the product bed) is about 900 feet per minute (274 meters per minute). The resulting oven finished French fries have a bulk moisture of about 36% and a fat content of about 17%. The fries have a texture and flavor similar to gold standard deep-fried French fries.

Example 4

Commercially available frozen shoestring-cut parfries of Examples 1 and 2, which have a bulk moisture content of about 64%, are used as the starting material.

The above mentioned par-fried potato strips are further processed. First, the frozen potato strips are fried by immersing in Primex 108 vegetable oil (available from Procter & Gamble Co.) for about 3 minutes at a temperature of about 290° F. (144° C.) to produce prebake par-fries. The prebake parfries are then frozen, packaged. and stored at 0° F. (–18° C.). The moisture content of the prebake par-fry is about 47% and the fat content is about 14%.

The frozen prebake par-fries are baked in a double impingement oven (Wolverine Corporation. Merrimac, Mass.; Model 2.0×051 pilot plant Jetzone™ oven) equipped with a continuous conveyor. The prebake par-fries are arranged in a single layer on an open wire mesh tray that is placed on the oven conveyor belt. Hot air impinges on the product from both the top and bottom, delivered from two banks of tubes located above and below the conveyor belt. The air velocity measured at the product bed is about 5.500 feet per minute (1,676 meters per minute). The air temperature within the oven chamber is 450° F. (232° C.) and the conveyor speed is adjusted such that the residence time in the oven is 1.25 minutes. Immediately after exiting the oven, the fries are lightly sprayed with warm (~150° F.) conditioned Primex 108 vegetable oil, about 2% oil by weight of the fries is sprayed onto the surface.

The resulting oven finished French fries have excellent texture and flavor, very similar to gold standard deep-fried French fries. The French fries have about 42% bulk moisture, about 15% total fat, an internal moisture content of about 71%, a surface Aw of about 0.3, and a Texture Value of 324 (Max. Force=276 g.; Area=324 g×sec.; Ratio of Area to Max. Force=1.17).

Example 5

A non digestible fat is used to prepare prebake par-fries. The non digestible fat is Olean ® brand olestra, made by the Procter & Gamble Company.

Russet Burbank potatoes at about 20% potato solids content are peeled, washed, and cut into 0.25 inch square by 3.5 inch long strips to make shoestring style French fried potatoes. The potato strips are blanched, partially dried to about a 15% weight loss, and par-fried in soybean olestra for about 60 seconds at about 375° F. After parfrying, the parfried potato strips frozen. The parfries have a moisture content of about 64% and a fat content of about 8%.

The above mentioned par-fried potato strips are further processed. First, the frozen par-fries are fried by immersing in soybean olestra for about 3 minutes at a temperature of about 300° F. (149° C.) to produce prebake par-fries. The prebake par-fries are then frozen by immersion in liquid N2, packaged, and stored at 0° F. (–18° C.). The moisture content of the prebake parfry is about 46% and the fat content is about 19%.

About 128 grams of the frozen prebake par-fries are placed on an open wire mesh oven tray in a single layer and then baked at a temperature of about 400° F. (204° C.) in a forced air convection oven (Wells Manufacturing Co. Model No. M42003S) for about 2.5 minutes. A turbulent air flow exists within the oven chamber, with an air velocity at the center of the oven chamber just above the product bed of about 900 feet per minute (274 meters per minute). The fries are then transferred to an open wire mesh basket in a single layer and the basket placed within the treatment zone of a high velocity impingement oven (manufactured by Industrial Combusion Services, Inc., Tyrone, Ga.). Hot air at 375° F. is directed onto the surface of the fries at a velocity of about 5,000 feet per minute (1,524 meters per minute). The fries are held in the impingement oven for 15 seconds.

The resulting reduced calorie oven finished French fries have a texture and flavor very similar to gold standard deep-fried French fries. The finished fries have a bulk moisture content of about 35%, a total fat content of about 15%. an internal moisture content of about 72%, a surface Aw of about 0.4, and a Texture Value of about 250.

What is claimed:

1. A process for preparing ready-to-eat oven-finished French fries, having from about 32% to about 46% bulk moisture, from about 8% to about 25% total fat, and an average maximum force of at least 200 grams or an average area of at least 200 gram-seconds, which comprises, baking prebake parfries in a forced air convection oven or impingement oven for about 0.5 minutes to about 10 minutes at a temperature of from about 325° F. (162° C.) to about 600° F. (316° C.), wherein the forced air convection oven provides air having a velocity of from about 500 feet (152 meters) to about 10,000 feet (3048 meters) per minute.

2. The process of claim 1 wherein the prebake parfries have from about 40% to about 56% bulk moisture, and wherein the oven-finished French fries have from about 33% to about 44% bulk moisture, from about 13% to about 23% total fat and an average maximum force of from about 210 to about 1,000 grams or an average area of from about 210 to about 1,000 gram seconds.

3. The process of claim 1 wherein the oven-finished French fries have a surface water activity of less than about 0.55 and an internal moisture content of from 55% to about 80%.

4. The process of claim 1 wherein the oven-finished French fries have a surface water activity of from about 0.1 to about 0.52 and an internal moisture content of from about 60% to about 77%.

5. The process of claim 4 wherein the oven-finished French fries have an internal moisture content of from about 63% to about 75%, a surface water activity of 0.2 to about 0.45 and an average maximum force of from about 240 to about 500 grams or an average area of from about 240 to about 500 gram seconds.

6. The process of claim 1 wherein the prebake parfries have from about 38% to 58% bulk moisture and from about 6% to about 25% total fat, wherein the fat is selected from the group consisting of triglycerides, non-digestible fat, reduced calorie fat and mixtures thereof.

7. The process of claim 1 wherein the prebake parfries are baked in a forced air convention oven at a temperature of from about 350° F. (176° C.) to about 500° F. (260° C.) for about 0.75 minutes to about 5 minutes and wherein the air velocity in the oven is from about 1,000 (305 meters) to about 8,000 feet (2438 meters) per minute.

8. The process of claim 1 wherein the oven-finished French fries are coated with an oil.

9. The process of claim 8 wherein the oil is from about 1% to about 10% by weight of the oven-finished French fries.

10. The process of claim 9 wherein the oil is from about 2% to about 8% by weight of the oven-finished French fries.

11. The process of claim 10 wherein the oil is a conditioned or flavored oil.

12. The process of claim 1 wherein the prebake parfries are baked for about 1 to about 4 minutes.

13. The process of claim 1 wherein the prebake parfries are baked for about 1.5 to about 3 minutes at a temperature of about 375° F. (190° C.) to about 475° F. (246° C.).

14. The process of claim 1 wherein the oven-finished French fries have from about 14% to about 20% total fat.

15. The process of claim 1 wherein the prebake parfries are baked for about 2 to 10 minutes.

16. The process of claim 1 wherein the parfries are baked for about 2 to about 5 minutes at 375° F. (190° C.) to 475° F. (246° C.).

17. The process of claim 1 wherein the prebake parfries are baked in a hot air impingement oven for about 0.5 to about 3 minutes at a temperature of about 375° F. (190° C.) to about 475° F. (246° C.).

18. The process of claim 1 wherein the prebake parfries are frozen and then placed on an oven tray in a single layer and baked at a temperature of from about 375° F. to about 475° F. for about 0.5 to 5 minutes.

19. The process of claim 1 wherein the prebake parfries are frozen, placed on an oven tray in a single layer and baked at a temperature of from about 375° F. (190° C.) to about 475° F. (246° C.) for about 0.75 to about 5 minutes, wherein the forced air convection oven provides air having a velocity of from about 1,000 feet (305 meters) to about 8,000 feet (2438 meters) per minute; and wherein the oven-finished French fries have from about 33% to about 44% bulk moisture, from about 13% to about 23% total fat, from about 60% to about 77% internal moisture, a surface water activity of less than about 0.52 and an average maximum force of about from about 210 to about 1,000 grams.

20. The process of claim 1 further comprising freezing the prebake parfries prior to baking, placing the frozen prebake parfries on a porous wire oven tray in a single layer, baking the parfries a first time at a temperature of from about 375° F. (190° C.) to about 475° F. (246° C.) for about 0.5 to about 2 minutes, then placing the once baked parfries on a solid oven tray in a single layer, and baking the once baked parfries a second time at a temperature of about 375° F. (190° C.) to about 475° F. (246° C.) for for about 1 to about 3 minutes.

21. The process of claim 20 wherein the once baked parfries are baked a second time in a circulating hot air convection oven and wherein the oven-finished French fries have from about 33% to about 44% bulk moisture, from about 13% to about 23% total fat, an internal moisture content of from about 60% to about 77%, a surface water activity of less than about 0.52, and a Texture Value of about 210 to about 1,000.

22. The process of claim 1 wherein the prebake parfries further comprise a crust region having a thermal conductivity of from about 0.1 to about 0.3 watts/m ° C., an interior starch matrix core having a thermal conductivity of from about 0.4 to about 0.7 watts/m ° C., and a surface heat transfer coefficient of from about 50 to about 400 watts/m$^{2°}$ C.

23. A process for preparing ready-to-eat oven-finished French fries having from about 35% to about 53% bulk moisture, from about 8% to about 22% total fat, and an average maximum force of at least 200 grams or an average area of at least 200 gram·seconds, which comprises baking prebake parfries in a forced air convection oven or impingement oven for about 0.5 minutes to about 10 minutes at a temperature of from about 325° F. (162° C.) to about 600° F. (316° C.), wherein the forced air convection oven provides air having a velocity of from about 500 feet (152 meters) to about 10,000 feet (3048 meters) per minute, and wherein the oven-finished French fries are coated with from about 1% to about 10% oil by weight.

24. The process of claim 23 wherein the oven-finished French fries have a surface water activity of less than about 0.55%, and an internal moisture content of from about 55% to about 80%.

25. The process of claim 24 wherein the prebake parfries have from about 44% to about to about 62% bulk moisture and from about 8% to about 22% total fat.

26. The process of claim 24 wherein the prebake parfries have from about 40% to about 58% bulk moisture and from about 4% to about 18% total fat.

27. The process of claim 23 wherein the total fat is selected from the group consisting of triglycerides, non-digestible fats, reduced calorie fats and mixtures thereof.

28. The process of claim 23 wherein the prebake parfries are selected from the group consisting of crinkle cuts, straight cut or steak fries, and wherein the oven-finished French fries have a bulk moisture content of from about 40% to about 48%.

29. The process of claim 23 wherein the prebake parfries further comprise a crust region having a thermal conductivity of from about 0.1 to about 0.3 watts/m ° C., an interior starch matrix core having a thermal conductivity of from about 0.4 to about 0.7 watts/m ° C., and a surface heat transfer coefficient of from about 50 to about 400 watts/m$^{2°}$ C.

* * * * *